Oct. 15, 1935.  H. D. GALVIN  2,017,399
COOKING AND LIKE APPARATUS
Filed Oct. 23, 1931  2 Sheets-Sheet 1
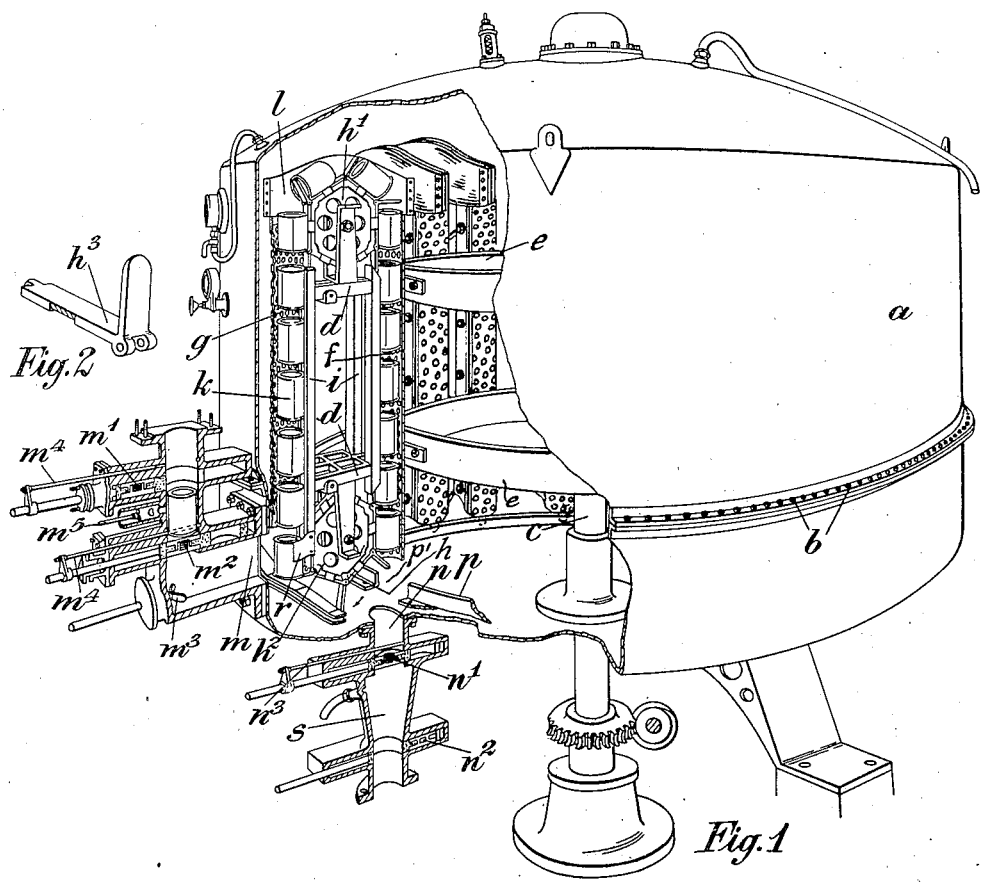

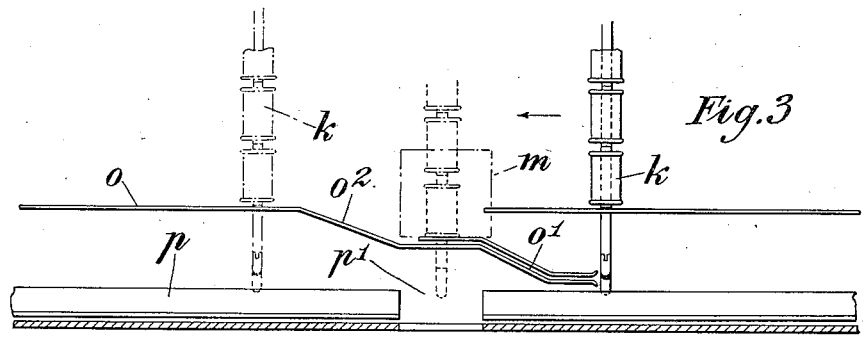
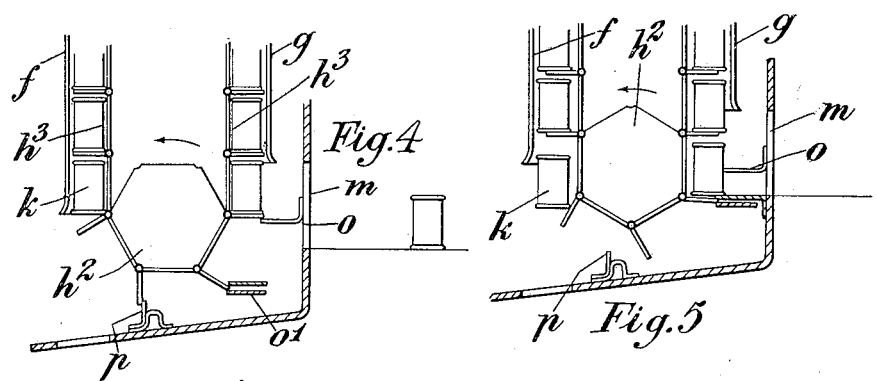
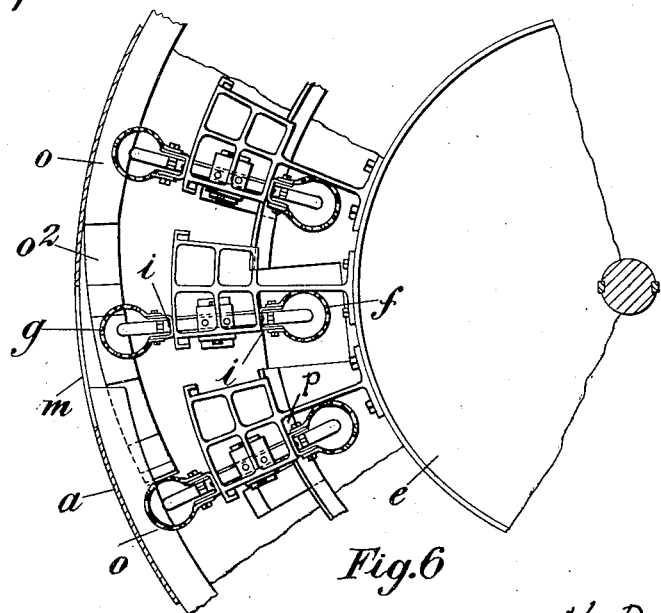

Patented Oct. 15, 1935

2,017,399

UNITED STATES PATENT OFFICE 2,017,399

COOKING AND LIKE APPARATUS

Herbert Dan Galvin, Ewell, England, assignor of one-third to Geoffrey Reginald Devereaux Shaw, Northampton, England, and one-third to Watkin Lindsay Watkins, Surrey, England Application October 23, 1931, Serial No. 570,722
In Great Britain July 10, 1931

14 Claims. (Cl. 126—272)

This invention relates to apparatus primarily intended for the cooking of tinned foods although it will be clear that it may be applied with equal effect and like advantage to other cooking, heating, cooling or like apparatus where a large output is required while at the same time the tins or other articles treated in the apparatus are required to remain therein for some length of time.

The invention consists in cooking or heating or like apparatus comprising a tank or container having therein a conveyor or like device adapted to hold a number of articles which are fed thereto one at a time and to move each article through a predetermined path for a given length of time before the article is removed from the tank or container.

In order to increase the output for a given capacity of tank or container I preferably arrange a number of such conveyors therein and provide each with a feeding-in and an outlet port or passage to or from the tank, or I arrange the conveyors to be moved in succession past a single feed-in and a single outlet port or passage.

In the last-mentioned case, I conveniently arrange the conveyors to be carried by a rotary drum or shaft within the tank or container and arrange that each conveyor will carry a tin or other article from the beginning to the end of its path of travel during the time that the shaft or rotary member makes a predetermined number of revolutions so that while the tins or other articles may be continuously fed into and out of the tank each tin will remain therein for a predetermined period of time.

When applying the invention to apparatus for cooking tinned foods or other apparatus where steam or other medium under pressure is supplied to the tank or container, I preferably control the feed-in and outlet ports or passages in such a manner that little if any pressure is lost while a tin or other article is actually passing through such ports or openings.

The invention also consists in novel means for reducing the pressure in the tins or containers to normal when they are ejected from the tank and other details and arrangements hereinafter described or indicated.

The accompanying drawings illustrate one convenient form of apparatus in accordance with the invention.

Figure 1 is a perspective elevation partly in section.

Figure 2 is a perspective view of one of the links which is adapted to act as a shelf and carry a tin or other article through the apparatus.

Figure 3 is an elevation on a larger scale of a part shown in Figure 1 illustrating the manner in which the conveyors carrying the tins or other articles are moved intermittently.

Figure 4 is a side view of Figure 3.

Figure 5 is a view similar to Figure 4 showing the parts in a different position, and Figure 6 is a plan, partly in section, looking down on the tubes in Figure 1 through which the tins or other articles are moved.

In carrying my invention into effect in one convenient manner when applying the same, for example, to the cooking of tinned foods, I form my improved apparatus with a tank or container $a$ of suitable shape and capacity and constructed after the manner of an autoclave in order that it may be suitable for containing steam or other medium under pressure but I preferably form the tank in two parts suitably bolted together by the bolts $b$ with a convenient packing medium between the flanges through which the bolts pass so that by removal of the bolts the whole of the upper part of the tank may be lifted off thus exposing all the interior mechanism when access is required to the same for renewal, inspection, repair or other purpose. Furthermore I do not dismantle or interfere with any single part of the drive or timing of the machine which can be run with the upper portion of the tank removed, for complete inspection, owing to the circular formation being balanced, and revolving in a horizontal plane.

Within the tank or container I mount a vertical shaft $c$ adapted to be rotated by any suitable external mechanism (not shown) and in order to utilize the capacity of the tank or container to maximum advantage I arrange upon and concentric with, the rotary shaft a pair of superposed rings $e$ to which there are secured brackets $d$ superposed in pairs radially around the rings. Each superposed pair of brackets carries inner and outer tubes $f$ and $g$ equidistantly arranged on two pitch circles, the axes of the tubes being arranged upon radii extending from the axis of the vertical shaft. The two circles of tubes thus formed upon circles of different diameters are free to rotate and each pair of tubes is provided with an endless chain $h$ carried over upper and lower sprockets $h'$ and $h^2$, the chains being formed of L-links $h^3$ (Fig. 3) and being arranged to travel through the tubes. Each tube is conveniently attached to a piece of channel $i$, attached to the radial arms and extending between the upper and lower sprockets so as to provide a means for the chain to move inward and outward, which is necessitated by the sprocket being of a polygonal formation since the diameter of the sprocket between the flats is less than the radial distance between the axes of the inner and outer tubes, while the diameter between opposite angles is equal to the radial distance between the axes of the inner and outer tubes. Such endless chains form a plurality of conveyors within the tank and in each case the chain passes up through an outer tube, over the upper sprocket, down through an inner tube and under the lower sprocket. The structure just described forms a plurality of frames supported in the tank and a chain conveyor mounted upon each of said frames.

Each sprocket is of polygonal form to suit the pitch distance of the chain links so that with each movement of a sprocket the chain will move through a distance equal to the pitch distance between links. The latter are L-shaped so that the horizontal projections act as shelves for carrying the tins $k$ or the like and suitable guides $l$ may be arranged adjacent the upper sprocket for the purpose of guiding the tins as they are carried round such sprocket.

The whole assemblage of conveyors upon the radial arms is adapted to be rotated by external means and the whole weight may be adequately supported on an external foot-step or thrust bearing. I may also arrange that each conveyor chain, upon reaching a certain part of the tank at which the feed-in port is located, will be moved through a distance of one link so that thus each conveyor will carry a tin from the beginning to the end of its path in a predetermined number of revolutions of the whole assemblage. For example, if it be desired that a tin shall remain in the apparatus for 20 minutes, I may form each conveyor with 15 links, associated with hexagonal sprockets, so that a tin will be moved in 15 steps from the beginning to the end of the conveyor path and if the vertical shaft makes one revolution in 1 minute 20 seconds, any particular tin will remain in the apparatus for 20 minutes while, owing to the number of tins with which the apparatus may be charged, the tins may be fed in continuously and may be discharged continuously from the apparatus.

The feed-in port $m$ is controlled by two sets of valves or dampers $m'$ and $m^2$ so that the tins (which may, for example, be fed from a rotary magazine, which is not shown) may pass through the first valve while the second valve controlling the inlet port is shut and thereupon the first valve is closed while the second valve is opened and the tin may be fed therethrough by gravity or by means of a mechanical pusher $m^3$ or other device, it being evident that cams or other suitable means may be adopted for appropriately timing the operation of the valves so that little if any pressure will be lost during the time that a tin is being inserted into the apparatus. When the tins are being fed at the rate of, say, 60 per minute it is clear that the operation of the valves must be rapidly and accurately timed and owing to the length of the tin, and fact that it falls by gravity, it is preferred to obtain a flying start for the tin so that no loss of time should occur. For this purpose I interpose above the slide a trip rod $m^4$, on which the tin rests, which trip rod is opened and releases the tin before the slide is actually fully open. The trip also serves the purpose of preventing tins damaging the seats of the slides. It can further be seen that no obstruction must be caused to the tin on its path of travel by steam, and therefore the compartment which is interposed between the two slides $m'$ and $m^2$ is exhausted and charged with steam, it having been found that with a pressure of steam in the conveyor the section between the two slides is filled with steam under pressure when the bottom slide is opened and closed. If now the top slide be opened the steam under pressure would prevent the article being inserted from falling until such steam pressure died away to zero, which would take too long and prevent the tin from passing the slide. This steam is therefore exhausted, as by the pump $m^5$, before the top slide is open, and the tin will then fall without obstruction on to the lower trip rod. It will be seen that the same difficulty will occur when I open the lower valve and trip rod upon which the tin is resting, as the steam pressure behind the valve would prevent the tin from falling, momentarily, whilst the pressure is becoming equal. I, therefore, with the same rotary valve charge the compartment with steam at the same pressure as that in the container, and therefore equalize the pressure in which the tin is resting, and upon opening the slide the tin will fall without any possible obstruction. Having passed the tin right through to the lower chamber, it is now ready to pass into the container, and this is done by the push rod $m^3$ as above indicated. A similar set of valves $n'$ and $n^2$ also appropriately timed may be provided to control the outlet port $n$ through which the tins are discharged in succession as the successive conveyors pass the outlet port at which time the tin which has reached the end of the conveyor path will be automatically discharged through the outlet port. The upper slide $n'$ is again fitted with a trip rod $n^3$.

In order to prevent any disturbance of the conveyor links due to want of balance from unequal loading or due to other reasons, I provide in a convenient position attached to the inner wall of the tank or container a shelf $o$ upon which one end of horizontal links or fingers of the conveyors may rest, while disposed within and below this shelf is a second concentric ramp or shelf $p$ which is adapted to be engaged by the angularly disposed fingers upon the conveyors, it being understood, however, that any other suitable means may be adopted for the purpose.

In order to give the necessary movement to the conveyor, the external ramp $o'$ is made sloping in the neighbourhood of the feed opening as clearly shown in Figure 3 and those fingers which are to pick up the tins which have been fed into the tank are held rigid by being engaged between parts forming a double ramp $o'$ which includes the inclined or sloping part above referred to. As the conveyor is thus intermittently moved past the inclined ramp, the upper part of the double ramp is discontinued to permit of the upward movement of the conveyor chain by the further inclined part $o^2$ (Figure 3), and the ramp $p$ is formed with an opening $p'$ to permit of the passage of the next succeeding finger. In this way it will be seen that each conveyor receives an impulse as it passes the operative part of the ramp and the ramp is designed to give exactly that amount of movement which is necessary to move the conveyor through one pitch distance.

In order that an incoming tin may be moved along the ramp until it is picked up by the appropriate finger, I provide at the lower end of each conveyor member a member r adapted to engage such tin for the purpose of moving the same.

It will be understood that the guide tubes through which the conveyor chains pass are preferably perforated as well as being open ended to permit of the free admission to the interior of the steam or heating medium and they will be formed with a longitudinal slot through which the horizontal portions or shelf parts of the links project as they are passing through the tubes.

In operation, the tins are fed successively from the rotary magazine or other feeding device through the controlled inlet port and are picked up successively by the appropriately positioned links of the various conveyor chains and are then intermittently moved along the conveyor path while the conveyors themselves are rotated about the axis of the vertical shaft, and the action continues until each tin has passed the whole length of a front tube, over the sprocket and down the inner tube, upon reaching the bottom of which it is released and passes out of the controlled outlet port, the result being, for example, that while tins of the like may be fed into the machine at the rate of, say, 60 a minute and withdrawn from the machine at a similar rate, yet each tin may be made to remain in the apparatus for a period of about 20 minutes, it being evident, of course, that these rates and times are given purely by way of example and may be varied by the appropriate choice of gearing while at the same time the pitch distance of the links of the conveyor chains may also be varied to suit the character of the articles to be treated in the apparatus. Furthermore, the height of the machine may be varied to accommodate more tins and a greater speed may be employed for loading and discharge.

When the treatment of, say, tins of food is carried out with steam under pressure it will be obvious that at the end of an operation the pressure within the tin is increased above the normal and if such tin were allowed to emerge from the apparatus into the atmosphere it would be in danger of bursting. When treating such articles, therefore, I prefer that they shall be ejected through the outlet port into a small chamber which is intermittently flooded with water by a pump and timed valves (not shown) or by other suitable means just prior to a tin being ejected from the outlet port so that such tin will drop into the flooded compartment whereby it will be cooled and its pressure reduced and thereafter the tin and flooding water are both ejected from the compartment which is subsequently again flooded for the reception of the next successive tin. For example, before the tins or other articles are allowed to pass out of the machine, the section s between the two outlet control slides n' and n² is flooded, the slide preventing the steam from entering is then opened and the water is brought to the same pressure to the square inch as the steam in the machine. The tin or other article falls into this section and the valve is then shut. The steam in the tin is almost immediately condensed. The tin is then dropped by opening the other slide, and the water and tin then fall into a tank of water at atmospheric pressure through which tank the tin passes on a conveyor until finally cooled. Alternatively a number of tins may be collected in the flooded compartment before the water is allowed to escape therefrom.

It will be understood that the invention is not limited to the foregoing application nor to the particular details of construction given by way of example since I may vary the construction of my conveyors, the means adopted for moving the same and the arrangements provided for mounting the conveyors within the tank depending upon the purpose for which the invention is to be employed or any practical requirements that may have to be fulfilled.

Having now described my invention, what I claim as new and desire to secure by Letters Patent is:—

1. In combination with a treatment chamber, a plurality of endless conveyors for passing a series of articles through the chamber, means for supporting said conveyors within the treatment chamber, means for moving said supporting means, means for moving the endless conveyors relatively to the supporting means and means for retaining the articles on said conveyors throughout substantially the entire path of travel of the conveyors.

2. In combination with a treatment chamber, a supporting element revolubly mounted within the chamber, a plurality of endless conveyors mounted upon said supporting means so as to rotate in planes radial to the axis of revolution of the supporting element and means for retaining the articles on said conveyors throughout substantially the entire path of travel of the conveyors.

3. In combination with a treatment chamber, a support within the chamber, a conveyor mounted on said support, means for moving said support, means for moving the conveyor relatively to its support and independently of the means which cause movement of the said support and means for retaining the articles on said conveyors throughout substantially the entire path of travel of the conveyors.

4. In combination with a treatment chamber, a support revolubly mounted within the chamber, means for imparting motion to said support, a conveyor mounted upon said support so as to be movable relatively to the support in a plane parallel with the axis of rotation thereof, means for imparting motion to the conveyor and means for retaining the articles on said conveyors throughout substantially the entire path of travel of the conveyors.

5. In combination with a treatment chamber, a support revolubly mounted within the chamber, a plurality of conveyors mounted on said support so as to be rotatable in respect thereto and revoluble therewith, means for feeding articles to the conveyors one at a time and means for retaining the articles on said conveyors throughout substantially the entire path of travel of the conveyors.

6. In combination with a treatment chamber, means for moving a series of articles through said chamber comprising a frame, a conveyor mounted on said frame, means for moving said conveyor in its own plane, means for simultaneously moving the frame bodily within the chamber and means for retaining the articles on said conveyor throughout substantially the entire path of travel of the conveyor.

7. In combination with a treatment chamber, means for moving a series of articles through the chamber comprising a support, a conveyor mounted on said support, means for moving the support bodily within the chamber, means for imparting motion to the conveyor in its own plane as it is moved bodily and means for retaining the articles on said conveyor throughout substantially the entire path of travel of the conveyor.

8. In combination with a treatment chamber, means for moving a series of articles through said chamber comprising an endless conveyor, means for rotating the conveyor bodily within the chamber in a plane at right angles to the plane of the conveyor, means for intermittently moving the conveyor in its own plane simultaneously with the first mentioned movement of the conveyor and means for retaining the articles on said conveyor throughout substantially the entire path of travel of the conveyor.

9. Apparatus for cooking tinned foods comprising in combination with a cooking chamber, a conveyor frame within said chamber, means for revolving said frame about an axis within the chamber, an endless conveyor mounted on said frame, means for moving said endless conveyor on said frame in a different path from that in which the frame is revolved and means for retaining the tins upon the endless conveyor throughout substantially the entire path of travel of the said conveyor.

10. Apparatus for cooking tinned foods comprising in combination with a cooking chamber, a plurality of conveyor frames within said chamber and radially disposed about a vertical axis within said chamber, means for revolving said frames about the said axis, an endless conveyor movably mounted upon each of said frames including means for supporting a plurality of tins thereon, means for imparting intermittent motion to the endless conveyors in a plane substantially parallel with the said axis, an inlet and an outlet for introducing the tins to and withdrawing the tins from said chamber and means for retaining the tins upon the endless conveyors throughout substantially the entire path of travel of said conveyors.

11. The device as claimed in claim 9 in which there are means for feeding the tins one at a time to the endless conveyor through an inlet in the chamber and the chamber has an outlet for withdrawal of the tins one at a time from the chamber as the endless conveyor passes said inlet and outlet respectively.

12. Apparatus for cooking tinned foods comprising a cooking chamber, conveyor frames in said chamber, means for revolving said frames about a vertical axis within said chamber, an endless conveyor mounted on each of said frames, means for moving said endless conveyors parallel to said chamber axis and means for retaining the tins of food upon the endless conveyors throughout substantially the entire path of travel of said conveyors.

13. A chamber, means for moving a series of articles within said chamber comprising a shaft and means for rotating said shaft, an endless conveyor, means supporting said endless conveyor from said shaft to cause it to move therewith, cam means on the inner wall of the chamber, and means forming part of the conveyor coacting with said cam means whereby the endless conveyor is intermittently actuated by the rotation of the shaft.

14. Apparatus for cooking tinned foods comprising in combination with a cooking chamber, a plurality of frames within said chamber, an endless conveyor mounted upon each of said frames, means for revolving said frames about a vertical axis within said chamber, said chamber having a single outlet and a single inlet common to all of said endless conveyors and a ramp mounted on the interior of said chamber and intermittently engaging each of said endless conveyors to move said conveyors during their revolution in a plane parallel with said chamber axis.

HERBERT DAN GALVIN.